(No Model.)
S. FORMAN.
BICYCLE.
No. 394,067. Patented Dec. 4, 1888.
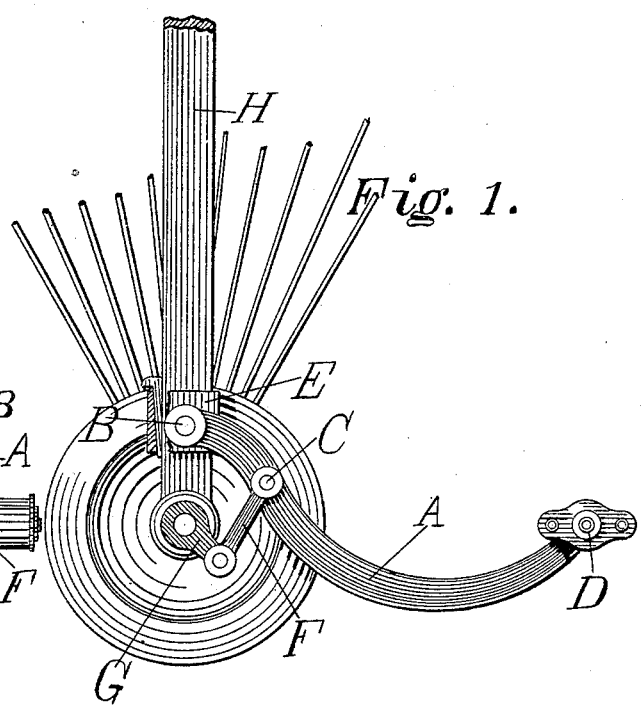
WITNESSES:
W. E. Copeland
H. K. Lancaster
INVENTOR.
Sands Forman.

UNITED STATES PATENT OFFICE.

SANDS FORMAN, OF GOLD HILL, NEVADA.

BICYCLE.

SPECIFICATION forming part of Letters Patent No. 394,067, dated December 4, 1888.

Application filed April 6, 1888. Serial No. 269,831. (No model.)

*To all whom it may concern:*

Be it known that I, SANDS FORMAN, a citizen of the United States, residing at Gold Hill, county of Storey, State of Nevada, have invented certain new and useful Improvements in Bicycles, of which the following is a specification.

My invention relates to means for propelling vehicles of the kind in which the motive power is supplied by the rider, and particularly to means for propelling what are known as "vertical-fork" bicycles.

The object of my invention is to produce a driving mechanism to which the power may be applied by a direct downward thrust of the limbs of the rider, thus causing the thrust of driving to react in a vertical line through the center of gravity of rider while in an erect posture.

In order that those skilled in the art to which my invention appertains may more fully understand its construction and operation, I will proceed to describe the same in detail in the following specification, and illustrate by the accompanying drawings, similar letters referring to similar parts in the different views.

Figure 1 is a side view of part of the wheel and part of the fork of a vertical-fork bicycle with my improved driving mechanism applied. Fig. 2 is an end view of same looking at the front, showing part of the driving-wheel and fork with driving mechanism.

Referring to the accompanying drawings, A represents a curved metallic lever of the second order, which may be curved to clear parts of machine, feet of rider, and for general graceful appearance. Oscillating about the fulcrum-pin B it is adapted to carry a pin at C, which may be fixed or adjustable to any desired position on arm A. At the end D is placed the pedal for the application of the power by feet of rider.

E represents a metallic collar or sleeve, which embraces and may slide upon the fork of bicycle H, and to which is fixed the fulcrum-pin B. This collar, together with its fulcrum-pin, may be fastened at any desirable point on the fork H by means of a wedge, screw, key, or other ordinary device.

F is a connecting-link, of metal or wood, connecting the points C on the lever A to the driving-crank G, which is firmly fixed to the axle of driving-wheel, the advantage being a better adaptation of the motion of the driving mechanism to the natural requirements and conditions of the rider, thus gaining power, ease, and endurance. The saddle or seat for rider being placed vertically over the pedal D, thus places the weight of the rider nearer midway between the wheels than is usual in this class of bicycles, thus securing greater safety to the rider.

Having thus described my invention, what I claim as new, and desire to secure by Letters Patent, is—

An improved bicycle comprising a wheel, a vertical fork, an axle having the cranks G, a sleeve or sleeves adjustable on the fork and provided with fulcrum-pins, levers mounted on said pins and carrying at the outer ends the pedals, said levers having the pins C, and the rods F, mounted on said pins C and connecting the levers with the cranks, substantially as and for the purpose described.

SANDS FORMAN.

Witnesses:
HENRY ROLFE,
A. L. EDWARDS.